United States Patent [19]

Kahle et al.

[11] Patent Number: 4,870,568

[45] Date of Patent: Sep. 26, 1989

[54] METHOD FOR SEARCHING A DATABASE SYSTEM INCLUDING PARALLEL PROCESSORS

[75] Inventors: Brewster Kahle, Boston; Craig W. Stanfill, Belmont, both of Mass.

[73] Assignee: Thinking Machines Corporation, Cambridge, Mass.

[21] Appl. No.: 878,532

[22] Filed: Jun. 25, 1986

[51] Int. Cl.⁴ .............................................. G06F 7/00
[52] U.S. Cl. ................................ 364/200; 364/222.9; 364/225.3; 364/225.4; 364/253.1; 364/255.7
[58] Field of Search ............... 364/200 MS File, 200, 364/900, 300

[56] References Cited

U.S. PATENT DOCUMENTS

| | | | |
|---|---|---|---|
| 4,118,788 | 10/1978 | Roberts | 364/900 |
| 4,152,762 | 5/1979 | Bird et al. | 364/200 |
| 4,255,796 | 3/1981 | Gabbe et al. | 364/900 |
| 4,358,824 | 11/1982 | Glickman et al. | 364/200 |
| 4,358,824 | 11/1982 | Glickman et al. | 364/200 |
| 4,451,901 | 5/1984 | Wolfe et al. | 364/900 |
| 4,464,650 | 8/1984 | Eastman et al. | 364/200 |
| 4,468,728 | 8/1984 | Wang | 364/200 |
| 4,495,566 | 1/1985 | Dickinson et al. | 364/200 |
| 4,543,630 | 9/1985 | Neches | 364/200 |
| 4,554,631 | 11/1985 | Reddington | 364/300 |

Primary Examiner—Gareth D. Shaw
Assistant Examiner—Adolfo Ruiz
Attorney, Agent, or Firm—Pennie & Edmonds

[57] ABSTRACT

A method to operate on a single instruction multiple data (SIMD) computer for searching for relevant documents in a database which makes it possible to perform thousands of operations in parallel. The words of each document are stored by surrogate coding in tables in one or more of the processors of the SIMD computer. To determine which documents of the database contain a word that is the subject of a query, a query is broadcast from a central computer to all the processors and the query operations are simultaneously performed on the documents stored in each processor. The results of the query are then returned to the central computer. After all the search words have been broadcast to the processors and point values accumulated as appropriate, the point values associated with each document are reported to the central computer. The documents with the largest point values are then ascertained and their identification is provided to the user.

15 Claims, 4 Drawing Sheets

METHOD FOR SEARCHING A DATABASE SYSTEM INCLUDING PARALLEL PROCESSORS

CROSS REFERENCE TO RELATED PATENTS AND APPLICATIONS

Related applications are "Parallel Processor", Ser. No. 499,474 filed May 31, 1983, now U.S. Pat. No. 4,598,450, "Method and Apparatus for Interconnecting Processors in a Hyper-Dimensional Array", Ser. No. 740,943, filed May 31, 1985, now U.S. Pat. No. 4,805,091, and "Method of Simulating Additional Processing in a SIMD Parallel Processor Array", Ser. No. 832,913, filed Feb. 24, 1986, now U.S. Pat. No. 4,773,038, all of which are incorporated herein by reference. Related patents are "Parallel Processor/Memory Circuit", U.S. Pat. No. 4,709,327 and "Method and Apparatus for Routing Message Packets", U.S. Pat. No. 4,598,400, both of which are incorporated by reference.

BACKGROUND OF THE INVENTION

This relates to the searching of large databases and in particular to the searching of large databases in which the search strategies are executed in parallel.

Today it has become increasingly popular to store information such as articles from newswires and newspapers, abstracts and articles from journals and other print media, encyclopedias and bibliographies, on large databases for computerized search and retrieval. For convenience of reference, each group of related information will be referred to as a document regardless of its format or original physical embodiment. The methods used in searching large databases have been limited by the sequential computers available to perform the search. Ideally a search method should have a high recall and precision. Recall is the proportion of relevant documents in the entire database which are retrieved. Precision is the proportion of retrieved documents which are relevant. Exhaustive search methods provide high recall and precision. The basic problem is that an exhaustive search may take a very long time. Therefore, non-exhaustive methods are used.

The usual method of organizing a database is a technique called "inverting the database". See G. James, *Document Databases* (Van Nostrand Reinhold Company 1985); C. J. Rijsbergen, *Information Retrieval*, p. 72 (Butterworths, 2d ed. 1979). Each document is assigned a unique document number. The words in the documents (excluding trivial words such as "a" and "the") are tagged with the document number and placed in an alphabetical index. To locate all documents containing a given word, the index is searched for that word, and a set of document numbers is returned. Alternatively, the words of each document may be stored by surrogate coding in which each word is represented by a hash code in a table of hash codes and a word search is performed by searching for the presence of the hash code associated with the word in interest.

To search for documents containing more than one word, a boolean search strategy is typically used on the inverted index. A boolean search is a search which achieves its results by logical comparisons of the query with the documents. Commercial application of this technique requires rooms full of disk drives and large mainframe computers. The response time is often quite slow depending on the complexity of the query because the search through the index and the logical comparisons are executed sequentially. Such systems are limited in the quality of the search they provide and are found to be clumsy to use. There is a tradeoff between recall and precision which limits the quality of boolean searches on large databases. Searching a database for documents containing a single word may lead to low recall, because there is no guarantee that all relevant documents will use that word. In addition, it is likely that a large number of irrelevant documents will be retrieved, leading to low precision. Searching for several words aggravates these problems. If the searcher looks for any of several words (a disjunctive query), recall improves but precision goes down. If the searcher looks for documents containing all of several words (a conjunctive query), precision improves but recall suffers. For a large database, this means that the searcher may have to choose between missing important information or searching through thousands of irrelevant documents. There are additional problems with the viability of using boolean queries for full text search. First, the user is playing a guessing game, trying to guess which words the authors of the documents he is interested in might have used. Second, even if he guesses the words, he has to figure out which connectives to use to avoid getting too much or too little data. This often involves several iterations as the user debugs his query. Finally, the syntax of boolean queries is complex, making the system difficult to learn.

A second search strategy employs a variant on boolean queries referred to as "simple queries". See C. J. van Rijsbergen, *Information Retrieval*, p. 160 (Butterworths, 2d ed. 1979). In this search strategy a query consists of a set of words, each of which is assigned a point value. Every document in the database is scored by adding up the point values for the words it contains. The result of this query is a set of documents, ordered by their total point values. Simple queries are comparable to boolean queries in the quality of the search they support. For example, if the user looks only at the documents which have a positive score, he is essentially looking at the results of a disjunctive query, and can expect high recall but low precision. An advantage of simple queries is that, between these two extremes, there are regions of intermediate recall and precision. In addition, they are easier to use than boolean queries. The user does not need to decide which connectives to use as there are none. The user does not need to learn a complex query language, as the query consists of a list of words. However, searching with simple queries, like searching with boolean queries, remains a guessing game. An additional problem is determining where to set the threshold in the point value of responses from the query in order to limit the number of retrieved documents to a manageable amount.

Another search strategy is relevance feedback. In this strategy simple queries are constructed from the texts of documents judged to be relevant. See G. Salton, *The SMART Retrieval System-Experiment in Automatic Document Processing*, p. 313 (Prentice-Hall 1971); C. J. van Rijsbergen, *Information Retrieval*, p. 105 (Butterworths, 2d ed. 1979). First, a search method is used to locate a small set of possibly relevant documents. The user then scans these documents, and marks any which he considers obviously relevant as good and any which he considers obviously irrelevant as bad. The text of the marked documents is then scanned for appropriate search words, and a query is constructed from these words. The more good documents a word occurs in, the greater its importance in the new query and therefore the higher the score assigned to that word. The new query may contain hundreds of terms. This query is then applied to the database in the same fashion as a simple query. Relevance feedback leads to both high precision and high recall due to the large number of words employed in the search process. One word taken by itself conveys little information; but several hundred words together convey a great deal. Only highly relevant documents will use a high proportion of this set of several hundred items. However, the only way to implement such a query is by an exhaustive search which is impracticable on the serial mainframe systems currently in use for database retrieval systems.

SUMMARY OF THE INVENTION

The present invention relates to the use of a massively parallel processor for document search and retrieval. The system as presented is sufficiently fast to permit the application of exhaustive search methods not previously feasible for large databases.

In the preferred embodiment of the invention the document data is stored and the searches are implemented on a single instruction multiple data (SIMD) computer which makes it possible to perform thousands of operations in parallel. One such SIMD computer on which the invention has been performed is the Connection Machine (Reg. TM) Computer made by the present assignee, Thinking Machines, Inc. of Cambridge, Massachusetts. This computer is described more fully in U.S. Pat. No. 4,598,400, which is incorporated herein by reference. In the embodiment of the Connection Machine Computer on which the invention has been practiced, the computer comprises 65,536 relatively small identical processors which are interconnected in a sixteen-dimensional hypercube network.

The words of each document are stored by surrogate coding in tables in one or more of the processors of the SIMD computer. To determine which documents of the database contain a word that is the subject of a query, a query is broadcast from a central computer to all the processors and the query operations are simultaneously performed on the documents stored in each processor. The results of the query are then returned to the central computer.

Because of the enormous parallel processing capability of an SIMD computer such as the Connection Machine Computer, simple query and relevance feedback search strategies using large numbers of search words and exhaustive or near exhaustive search strategies are now practical. Scoring of the results of such searches is done in parallel at each processor. For example, each processor which stores a hash value associated with a word that is the subject of a query can be directed to accumulate a point value for that word. After all the search words have been broadcast to the processors and point values accumulated as appropriate, the point values associated with each document are reported to the central computer. The documents with the largest point values are then ascertained and their identification is provided to the user.

DESCRIPTION OF THE DRAWINGS

These and other objects, features and elements of the invention will be more readily apparent from the following Description of the Preferred Embodiment of the Invention in which.

DETAILED DESCRIPTION OF THE PREFERRED EMBODIMENTS

In the system of the invention, a single instruction multiple data (SIMD) computer such as the Connection Machine Computer is preferably used. This computer is described in detail in U.S. Pat. No. 4,598,400.

Figure 1:
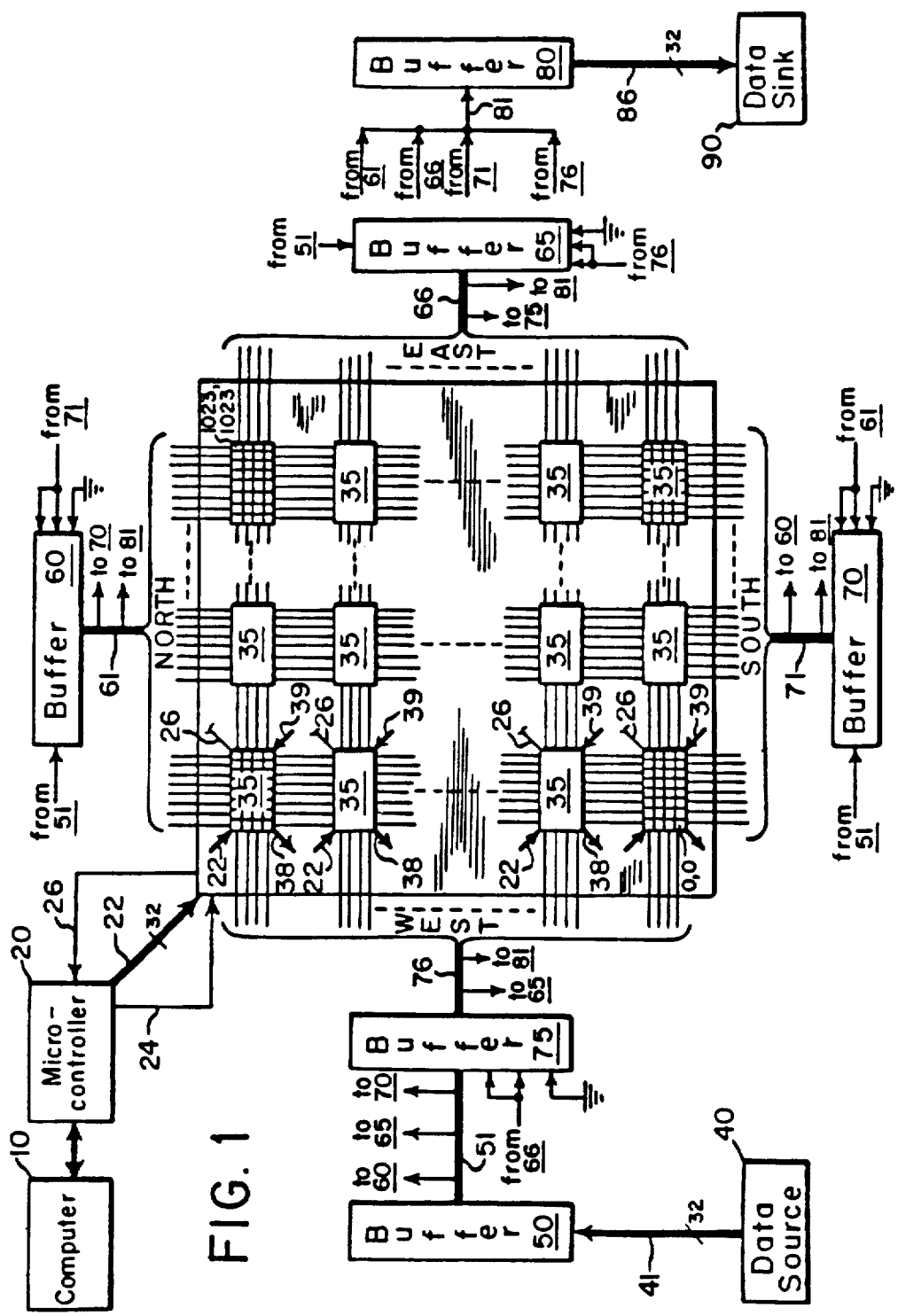
FIGS. 1 and 2 depict in schematic form details of a SIMD processor preferably used in the practice of the invention.

As shown in FIG. 1A of that patent which is reproduced in FIG. 1, the computer system comprises a central computer 10, a microcontroller 20, an array 30 of parallel processing integrated circuits 35, a data source 40, a first buffer and multiplexer/demultiplexer 50, first, second, third and fourth bidirectional bus control circuits 60, 65, 70, 75, a second buffer and multiplexer/demultiplexer 80, and a data sink 90. Central computer 10 may be a suitably programmed commercially available computer such as a Symbolics 3600-series LISP Machine. The database to be searched is stored as described below in the memories of individual processor/memories 36 in integrated circuits 35.

Microcontroller 20 is an instruction sequencer of conventional design for generating a sequence of instructions that are applied to array 30 by means of a thirty-two bit parallel bus 22. Microcontroller 20 receives from array 30 a signal on line 26. This signal is a general purpose or GLOBAL signal that can be used for data output and status information. Bus 22 and line 26 are connected in parallel to each IC 35. As a result, signals from microcontroller 20 are applied simultaneously to each IC 35 in array 30 and the signal applied to microcontroller 20 on line 26 is formed by combining the signal outputs from all of ICs 35 of the array.

In the embodiment of the Connection Machine Computer used in the practice of the present invention, array 30 contains 4096 ($=2^{12}$) identical ICs 35; and each IC 35 contains 16 ($=2^4$) identical processor/memories 36. Thus, the entire array 30 contains 65,536 ($=2^{16}$) identical processor/memories 36.

Processor/memories 36 are organized and interconnected in two geometries: a conventional two-dimensional grid pattern and a 16 dimension hypercube network. In the grid pattern, the processor/memories are organized in a rectangular array and connected to their four nearest neighbors in the array. The sides of this array and the four neighbors are identified as NORTH, EAST, SOUTH and WEST. The hypercube network allows processors to communicate by exchanging packets of information. This configuration is realized by organizing and interconnecting the IC's 35 in the form of a Boolean n-cube of sixteen dimensions. Each IC 35 is provided with logic circuitry to control the routing of messages through such an interconnection network; and within each IC, bus connections are provided to every processor/memory so that each processor/memory can communicate with any other by sending a signal through at most sixteen communication lines.

Figure 2:
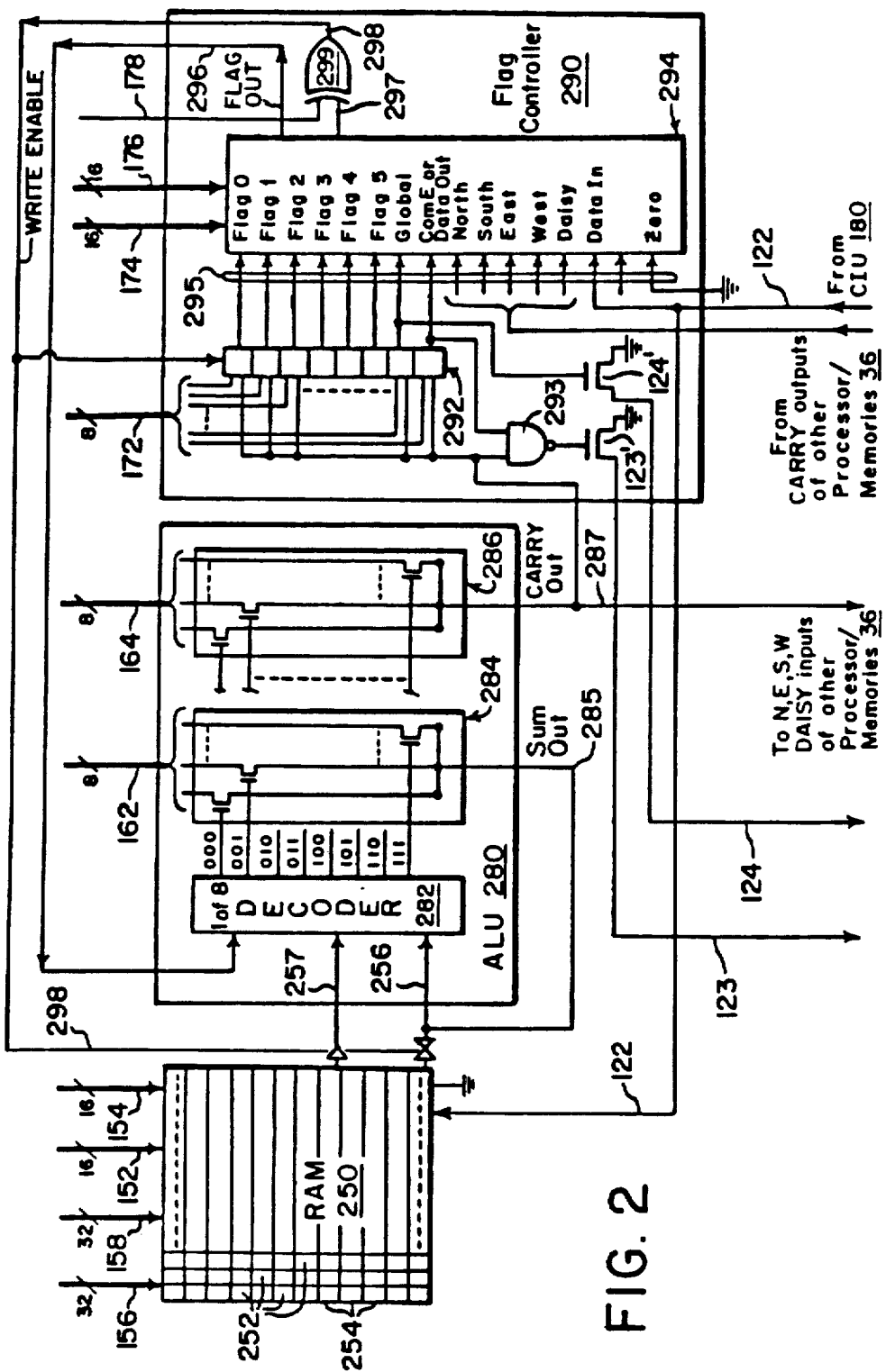

An illustrative processor/memory 36 is disclosed in greater detail in FIG. 2 which is the same as FIG. 7A of U.S. Pat. No. 4,598,400. As shown in FIG. 2, the processor/memory comprises random access memory (RAM) 250, arithmetic logic unit (ALU) 280 and flag controller 290. The ALU operates on data from three sources, two registers in the RAM and one flag input, and produces two outputs, a sum output that is written into one of the RAM registers and a carry output that is made available to certain registers in the flag controller as well as to certain other processor/memories.

The inputs to RAM 250 are busses 152, 154, 156, 158, a sum output line 285 from ALU 280, the message packet input line 122 from communication interface unit (CIU) 180 of FIG. 6B of U.S. Pat. No. 4,598,400 and a WRITE ENABLE line 298 from flag controller 290. The outputs from RAM 250 are lines 256, 257. The signals on lines 256, 257 are obtained from the same column of two different registers in RAM 250, one of which is designated Register A and the other Register B. Busses 152, 154, 156, 158 address these registers and the columns therein in accordance with the instruction words from microcontroller 20. Illustratively, RAM 250 has a memory capacity of 4096 bits.

Flag controller 290 is an array of eight one-bit D-type flip-flops 292, a two-out-of-sixteen selector 294 and some logic gates. The inputs to flip-flops 292 are a carry output signal from ALU 280, a WRITE ENABLE signal on line 298 from selector 294, and the eight lines of bus 172 from programmable logic array (PLA) 150 of FIG. 6B of U.S. Pat. No. 4,598,400. Lines 172 are address lines each of which is connected to a different one of flip-flops 292 to select the one flip-flop into which a flag bit is to be written. The outputs of flip-flops 292 are applied to selector 294.

The inputs to selector 294 are up to sixteen flag signal lines 295, eight of which are from flip-flops 292, and the sixteen lines each of busses 174, 176. Again, lines 174 and 176 are address lines which select one of the flag signal lines for output or further processing. Selector 294 provides outputs on lines 296 and 297 that are whichever flags have been selected by address lines 174 and 176, respectively.

ALU 280 comprises a one-out-of-eight decoder 282, a sum output selector 284 and a carry output selector 286. As detailed in U.S. Pat. No. 4,598,400, this enables it to produce sum and carry outputs for many functions including ADD, logical OR and logical AND. ALU 280 operates on three bits at a time, two on lines 256, 257 from Registers A and B in RAM 250 and one on line 296 from flag controller 290. The ALU has two outputs: a sum on line 285 that is written into Register A of RAM 250 and a carry on line 287 that may be written into a flag register 292 and applied to the inputs of the other processor/memories 36 to which this processor/memory is connected.

The words of the document are stored in a table format originally developed for spelling correction dictionaries called surrogate coding. See Dodds, "Reducing Dictionary Size by Using a Hashing Technique", *Communications of the ACM*, Vol. 25, No. 6, pp. 368-370, (June 1982); Nix, "Experience With a Space Efficient Way to Store a Dictionary", *Communications of the ACM*, Vol. 24, No. 5, pp. 297-298, (May, 1981); Peterson, "Computer Programs for Detecting and Correcting Spelling Errors", *Communications of the ACM*, Vol. 23, No. 12, pp. 676-687. (December, 1980). Although the tables may be of any size, it is preferred that the table be 512 or 1024 bits long. The 4096 bits of RAM allows for six tables of 512 bits or three tables of 1024 bits with the remaining memory used as scratch memory.

To store the words of a document in the table, the table is first initialized to zero. A fixed number of independent hash codes—ten, in the presently preferred embodiment—are generated for each significant word in the document. Each code corresponds to a position in the table. For example, for a table of 512 bits, each code would be between zero and 511. For each of the hash codes generated for a word, the corresponding binary bit at that address in the table is set to one. To minimize data storage requirements, trivial words such as "a" and "the" are not included in the table. In addition, a text indexer preferably is used which picks out noun phrases in a document to input into the table. This allows for a three to one compression of the document.

Each document of the database is stored in this fashion in one or more tables in one or more processor/memories of the SIMD computer. If a document contains more than the maximum number of words that should be stored in a table, additional tables are used. For example if a ninety word document is stored in the database, and thirty words are contained in each table, a total of three tables are used. The set of tables which contain a single document is called a chain. Preferably each of the tables in a chain is located in a physically different processor, and each table is located in the same portion of its respective memory. Alternatively, all the tables could be located in the same physical processor.

To probe for the presence of a word in the documents stored in the tables of the processor/memories, the corresponding bits of the ten hash codes for that word are checked in each table of the processor/memories. If any of the ten bits in a table are zero, the word is definitely absent from that table, yielding a negative response. If all ten bits are one, then the word is probably present yielding a positive response. Although this algorithm does not generate false negatives, there is a possibility of false positives. The probability in this algorithm of a false positive is dependent on the number of words contained in each table as well as the size of the table and the number of bits which are set for each word. In a table of 512 bits with ten bits set for each word, the probability of a false positive can be shown to be about one in a million for a table containing fifteen words, one in a hundred thousand for a table of twenty words and thirty in a hundred thousand for a table of thirty words. For optimal system performance, it seems preferable to limit the table to about fifteen to thirty words.

Figure 3:
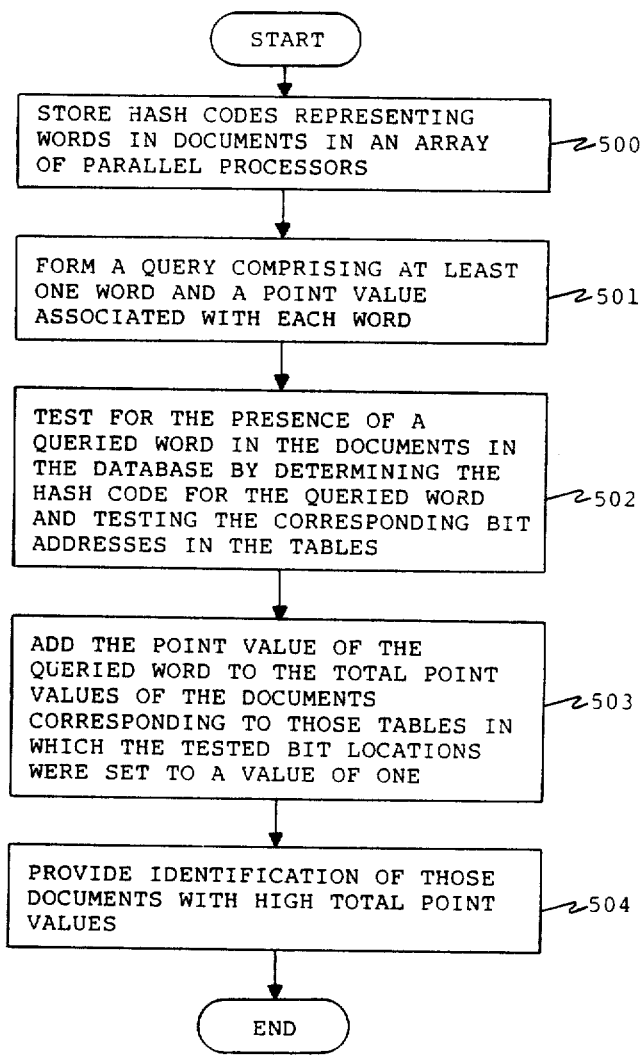
FIG. 3 is a block diagram of the search and retrieval process.
Figure 4:
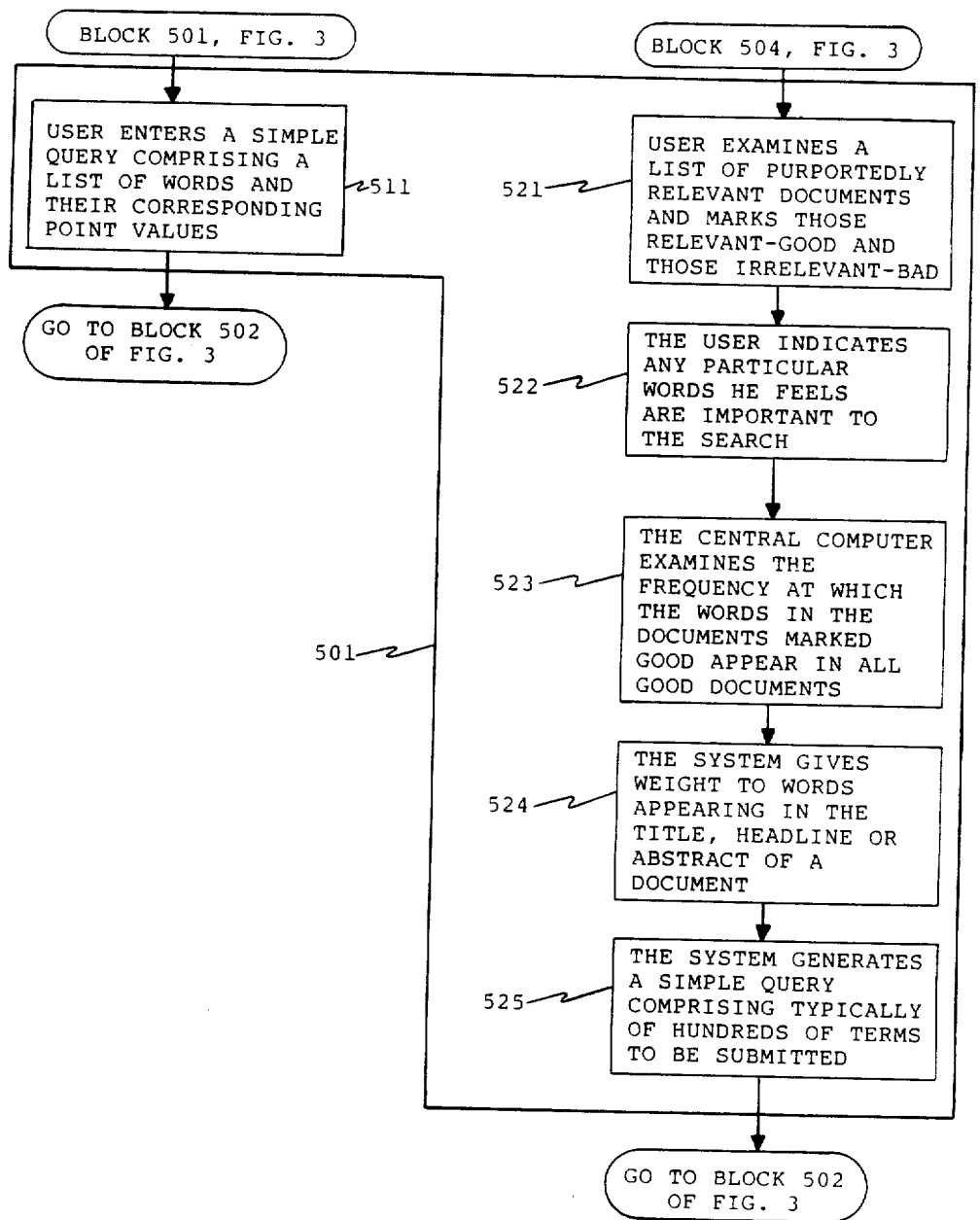
FIG. 4 is a block diagram of the query forming process.

FIGS. 3 and 4 illustrates the exhaustive search strategy used in the system of the invention. To permit user access to the documents from a computer terminal, the documents are stored in full text in the central computer and a display terminal is provided for accessing this database. As indicated in Box 500 of FIG. 3, the significant words of each document are then hash coded and the hash codes are then stored in one or more tables in the memories of the processor/memories of the SIMD computer. As indicated above, trivial words are ignored and storage typically is limited to noun phrases. To begin a search, the user selects at least one word and preferably several that delineate the subject of interest. This word or words constitutes a query (Box 501). When first executing a query as indicated by the left-hand side of FIG. 4, the user enters these words into the central computer and may also assign point values to each word reflecting his estimate of the significance of the word in the search (Box 511, FIG. 4). The central computer then examines the full text of the documents stored in the central computer for the presence of one or more of those words (Box 502, FIG. 3), computes point value scores for the documents (Box 503, FIG. 3). if applicable, and identifies to the user the documents selected by this process (Box 504, FIG. 3). As indicated by the righthand side of FIG. 4, the user then examines the documents and informs the central computer which documents are relevant or "good" and which are irrelevant or "bad"(Box 521, FIG. 4). The computer then examines these documents to locate appropriate search words and formulates a query from these words. As indicated in Box 523, the computer also assigns to these words a point value basing its valuation, for example, on the number of good documents in which the word appears. Other parameters, such as the frequency of occurrence of a particular word for example, words which do not appear frequently in a document would have a higher point value assigned to the word, whether a word occurs in the title or headlines, and whether the user has made an explicit note of the word, may also be used in constructing the simple query (Box 524, FIG. 4). As indicated by Box 525, the resulting query may contain hundreds of words.

As indicated in Box 502, FIG. 3, this query is then used to search the hash tables stored in the memories of the SIMD computer. For each word in the query, the central computer determines from a look-up table the values or addresses in the hash table where the ten bits of the corresponding hash code are stored. It then instructs each processor/memory to read the bit at each of those addresses. Each bit that is read is used to set a flag and this flag is then ANDed together with the next bit that is read to determine the next value of the flag. If any of the hash code bits has a value of zero, the flag becomes zero, and the test fails, indicating that the word in question is not stored in that table. If the test succeeds, the flag is a one, the word is assumed to be in the document represented by that table and, as indicated by Box 503 of FIG. 3, the point value associated with that word is awarded to that document and accumulated with any other point values associated with other words in the document.

Advantageously, communications from the individual processor/memories to the central computer can be minimized by storing the point values for each document at the individual processor/memories until completion of the entire query search. Point values are accumulated after each word is tested by broadcasting to all the processor/memories an instruction to accumulate the point value if the flag bit is one.

If a document is divided among multiple tables, the values in each table are passed to the first table in the chain where they are accumulated.

Documents having the largest point values are then identified by sorting the point values stored in the processor/memories in order of magnitude (Box 504, FIG. 3). Computer programs for such a sort are well known in the art and their adaptation to a SIMD computer will be apparent from the foregoing description. Alternatively, the point values can be tested to identify the maximum point values and the identification of the documents associated with a series of such maxima can be extracted from the processor/memories. To perform such a test, the central computer simultaneously tests the most significant bit of the point values stored in each of the processor/memories. This is readily done if the point values are all stored at the same addresses in all the processor/memories. The test is in the form of an instruction to set a first flag and ignore further parts of the test if the most significant bit is zero and to produce an output on the GLOBAL signal line 26 of FIG. 1 if the most significant bit is a one. If no output is received on line 26 from any processor/memory, the central computer resets all the flags and their processor/memories and begins the test anew with the next most significant bit. If an output is received, the central processor enters the next cycle of the test and issues an instruction to those processor/memories still being tested to set a second flag and ignore further parts of the test if the test of the next most significant bit is zero and to produce an output on the GLOBAL signal line if that bit is a one. If no output is received on the GLOBAL line, the second flags of the processor/memories that were shut down during that cycle of the test are reset, those processor/memories are reactivated and the third most significant bit is tested. If, however, an output is received, the first flags are set in those processor/memories whose second flags were set; and the central processor enters the next cycle of the test. It then tests the third most significant bit and so on. As a result of this process, the processor/memory having the maximum point value is isolated in the array and the document associated with that point value is identified. The point value associated with that document is then set to zero and the process is repeated to find the document having the next highest point value; and so on.

Since a large number of documents may be retrieved using the simple query search strategy, it is preferred that some means be used to limit the number of retrieved documents to a managable amount. Preferably, this is done by retrieving the best documents (i.e., those with the highest point values) first and stopping when enough documents have been retrieved. Alternatively, a threshold point value can be established so that if the total point value of the document is below the threshold point value, the document is not retrieved.

It has been found that by utilizing the system of the invention the user can obtain both high recall and precision. Exhaustive searches which were not practicable can now be used. Since the searches are executed in parallel the search time is extremely fast. For example, a simple query search of 200 terms on a 112 Megabyte database is executed in 60 milliseconds.

As will be apparent to those skilled in the art, numerous modifications may be made within the scope of the above described invention. While the invention has been described in terms of parallel processing implementation of a combination of simple queries and relevant feedback search strategies other search strategies such as boolean search strategies and other exhaustive search strategies may be used.

What is claimed is:

1. A process for searching for relevant documents in a database comprising the steps of:
    (a) forming a database by storing for each of a plurality of documents at least one table of hash codes representing words in the document, the table(s) that represent the words in each different document being stored in a different digital data processor, each hash code comprising information at a plurality of bit locations;
    (b) forming a query having at least one word and a point value of relevance assigned to each word;
    (c) testing if the word in the query is in the database by:

(1) determining the bit locations in the table at which the hash code corresponding to the queried word is stored; and (2) simultaneously testing in each of the processors the bit locations corresponding to the queried word;

(d) adding at each digital data processor the point value associated with the queried word to a total point value for the document if the hash code is found at all the bit locations corresponding to the queried word that are tested in that processor; and (e) providing identification of those documents in the database with high total point values.

2. The process of claim 1 wherein the step of forming a query comprises:

(a) identifying a group of relevant documents;

(b) determining a frequency at which the words in the documents occur among all the relevant documents; and (c) generating a query based on the frequency of occurrence of words in the relevant documents.

3. The process of claim 1 wherein the step of adding the point value of a queried word to the total point value of a document comprises:

(a) setting a flag in the processor to indicate the presence of the queried word in the table;

(b) communicating simultaneously from a central computer to each of the processors a command to add the point value assigned to the word to the total point value of the document if the flag in the processor is set.

4. The process according to claim 1 wherein a document is represented by a chain of tables, each of which stores a representation of a portion of the document, each chain of tables comprising a first table and one or more successive tables, the step of adding the point value associated with the queried word to the total point value of the document comprising the steps of:

(a) communicating the total point value of the portion of the document represented by each successive table in the chain to the preceding table in the chain; and (b) accumulating the total point values of all the tables in the first table of the chain.

5. The process according to claim 1 wherein the storing of document data in the processors comprises the steps of:

(a) initializing to zero a table of bits in a memory of each processor;

(b) generating a plurality of independent hash codes for each word with values in an address range of the table; and (c) for each hash code, setting a bit at an address in the table corresponding to each hash code value.

6. The process of claim 1 wherein the step of providing the identification of those documents with high total point values comprises identifying the documents in numeric order of total point value, said process comprising:

(a) testing the most significant bit of the point value stored in memory in each processor;

(b) setting a flag in the processor if the most significant bit is zero;

(c) repeating step (a) and (b), if necessary, until a non-zero bit is identified; and (d) successively testing bits of the point values of lesser significance in those processors where a non-zero bit is identified until a document is identified with the highest total point value.

7. The process of claim 1 wherein the step of providing the identification of those documents with high total point values comprises identifying the documents in numeric order of total point value, said process comprising:

(a) testing the most significant bit of the point values stored in memory in each processor;

(b) setting a flag in the processor if the most significant bit is zero;

(c) testing the next most significant bit of the point values stored in memory at each processor where a flag is not set; and (d) setting a second flag in the processor if the next most significant bit is zero.

8. The process of claim 1 wherein the step of providing the identification of documents with high total point values comprises:

(a) successively testing at each digital data processor bits of the total point values associated with each document beginning with the most significant bit and continuing to test bits of lesser significance until the highest total point value is identified; and (b) repeating step (a) of this claim on the total point values remaining after the highest total point value is identified in the previous execution of step (a).

9. The method of claim 1 wherein different point values are assigned to at least some different words.

10. A process for searching in a database comprising the steps of:

(a) forming a database by storing in each of a plurality of digital data processors at least one table of hash codes, the hash codes in each table representing a group of related words;

(b) forming a query having at least one word and a point value of relevance assigned to each word;

(c) testing if the word in the query is in the database by:

(1) determining the bit locations in the table at which the hash code corresponding to the queried word is stored; and (2) simultaneously testing in each of the processors the bit locations corresponding to the queried word;

(d) at each digital data processor, adding the point value associated with the queried word to a total point value for that group of related words if the hash code is found at all the bit locations tested in the table; and (e) providing identification of those groups of related words in the database with high total point values.

11. The process of claim 10 wherein the step of adding the point value of a queried word to the total point value for a group of related words comprises:

(a) setting a flag in the processor to indicate the presence of the queried word in the table;

(b) communicating simultaneously from a central computer to each of the processors a command to add the point value of the queried word to the total point value for the group of related words if the flag in the processor is set.

12. The process of claim 10 wherein the step of providing the identification of those groups of related words with high total point values comprises:

(a) successively testing the bits of the total point values associated with each group of related words beginning with the most significant bit and continuing to test bits of lesser significance until the highest total point value is identified; and (b) repeating step (a) of this claim on the total point values remaining after the highest total point values is identified in the previous execution of step (a).

13. The process of claim 10 wherein the step of providing the identification of those groups of related words with high total point values comprises identifying the groups in numeric order of total point value, said process comprising:
   (a) testing the most significant bit of the point values stored in memory in each processor;
   (b) setting a flag in the processor if the most significant bit is zero;
   (c) testing the next most significant bit of the point values stored in memory at each processor where a flag is not set;
   (d) setting a second flag in the processor if the next most significant bit is zero.

14. The method of claim 10 wherein different point values are assigned to at least some different words.

15. A process for searching in a database comprising the steps of:
   (a) forming a database by storing in each of a plurality of digital data processors at least one table of hash codes, the hash codes in each table representing a group of related words;
   (b) forming a query having at least one word;
   (c) testing for the presence of the queried word in the database by:
      (1) determining the bit locations in the table at which the hash code corresponding to the queried word is stored; and
      (2) simultaneously testing in each of the processors the bit locations corresponding to the queried word; and
   (d) scoring each group of related words, a score for a group of related words being increased if the hash code is found at all the bit locations tested in the table.

* * * * *